US012260400B2

(12) United States Patent
Ward et al.

(10) Patent No.: US 12,260,400 B2
(45) Date of Patent: Mar. 25, 2025

(54) COMPUTER-IMPLEMENTED METHOD AND SYSTEM FOR DIGITAL SIGNING OF TRANSACTIONS

(71) Applicant: Star Hat Solutions Limited, Winchester (GB)

(72) Inventors: Christopher Dylan Ward, Winchester (GB); Roumen Gueorguiev Asenov, Winchester (GB); Michael James Elkins, Winchester (GB)

( * ) Notice: Subject to any disclaimer, the term of this patent is extended or adjusted under 35 U.S.C. 154(b) by 393 days.

(21) Appl. No.: 17/286,356

(22) PCT Filed: Oct. 16, 2019

(86) PCT No.: PCT/GB2019/052939
§ 371 (c)(1),
(2) Date: Apr. 16, 2021

(87) PCT Pub. No.: WO2020/079423
PCT Pub. Date: Apr. 23, 2020

(65) Prior Publication Data
US 2021/0398112 A1 Dec. 23, 2021

(30) Foreign Application Priority Data
Oct. 19, 2018 (GB) ...................................... 1817099

(51) Int. Cl.
*G06Q 20/38* (2012.01)
*G06Q 20/36* (2012.01)
(Continued)

(52) U.S. Cl.
CPC ..... *G06Q 20/3825* (2013.01); *G06Q 20/3829* (2013.01); *G06Q 20/389* (2013.01);
(Continued)

(58) Field of Classification Search
CPC ........... G06Q 20/3825; G06Q 20/3829; G06Q 20/389; G06Q 20/401; H04L 9/3247; H04L 2209/56
(Continued)

(56) References Cited

U.S. PATENT DOCUMENTS

2017/0154331 A1* 6/2017 Voorhees ............... H04L 9/3255
2017/0206523 A1* 7/2017 Goeringer .......... G06Q 20/3827
(Continued)

OTHER PUBLICATIONS

"International Search Report and Written Opinion from PCT/GB2019/052,939", Apr. 29, 2021, 1-8.
(Continued)

*Primary Examiner* — Courtney P Jones
(74) *Attorney, Agent, or Firm* — Blanchard Horton PLLC

(57) ABSTRACT

The present invention discloses a computer-implemented method for digitally signing transactions between multiple nodes comprising preparing a multi-party transaction block, comprising at least one transaction object comprising at least a goods transaction and a payment transaction, adding first digital asset sources, digital signing and transmitting the multi-party transaction block in the previous node, to a subsequent node, adding additional digital asset sources, digital signing and finally submitting the multi-party transaction block to a transaction ledger by the final node, wherein all of the digital asset sources to be swapped are recorded in the ledger. The present invention further discloses a system to accomplish the above, comprising a first node, a second node, and a transaction ledger. Further a computer program product including a program for a processing device, comprising software code portions for performing the steps of the above method is disclosed.

12 Claims, 4 Drawing Sheets

(51) Int. Cl.
  *G06Q 20/40* (2012.01)
  *H04L 9/32* (2006.01)

(52) U.S. Cl.
  CPC ......... *G06Q 20/401* (2013.01); *H04L 9/3247* (2013.01); *G06Q 20/367* (2013.01); *H04L 2209/56* (2013.01)

(58) Field of Classification Search
  USPC .......................................................... 705/71
  See application file for complete search history.

(56) References Cited

U.S. PATENT DOCUMENTS

| | | | | |
|---|---|---|---|---|
| 2018/0330342 | A1* | 11/2018 | Prakash | H04L 9/50 |
| 2019/0028276 | A1* | 1/2019 | Pierce | G06Q 20/3825 |
| 2019/0043043 | A1* | 2/2019 | Saraniecki | H04L 9/0637 |
| 2019/0199516 | A1* | 6/2019 | Carver | H04L 9/3297 |
| 2019/0229911 | A1* | 7/2019 | Allen | H04W 4/70 |
| 2020/0065802 | A1* | 2/2020 | Mathieson | H04L 9/0637 |
| 2021/0241270 | A1* | 8/2021 | Raevsky | G06Q 20/385 |
| 2021/0344500 | A1* | 11/2021 | Vaughan | H04L 9/3239 |

OTHER PUBLICATIONS

Green, Mathew, et al., "Bolt: Anonymous Payment Channels for Decentralized Currencies", D2: IACR, International Association for Crypotologic Research, vol. 20160824:221807, Aug. 25, 2016, p. 1-32., Aug. 25, 2016, 1-32.

Herrera-Joancomarti Joan, et al., "Privacy in Bitcoin Transactions: New Challenges from Blockchain Scalability Solutions", Lecture Notes in Computer Science; Lect.Notes Computer, Springer, Berlin, Heidelberg, pp. 26-44, XP047355008, ISBN: 978-3-642-17318-9, Sep. 8, 2016, 26-44.

Mccorrey, Patrick, et al., "Towards Bitcoin Payment Networks", D3: International Conference On Financial Cryptography and Data Security; [Lecture Notes in Computer Science; Lect. Notes Computer], Springer, Berlin, Heidelberg, XP047348067, ISBN: 978-3-642-17318-9, Jun. 30, 2016, 57-76.

Poon, Joseph, et al., "The Bitcoin Lightning Network: Scalable Off-Chain Instant Payments", D4: Jan. 14, 2016 (Jan. 14, 2016), XP055358006, URL:https://lightning.network/lightning-network-paper.pdf, Jan. 14, 2016.

\* cited by examiner

COMPUTER-IMPLEMENTED METHOD AND SYSTEM FOR DIGITAL SIGNING OF TRANSACTIONS

FIELD OF THE INVENTION

The present invention relates generally to a computer-implemented method and system for digital signing of transactions.

BACKGROUND OF THE INVENTION

The following discussion of the prior art is intended to facilitate an understanding of the invention and to enable the advantages of it to be more fully understood. It should be appreciated, however, that any reference to prior art throughout the specification should not be construed as an express or implied admission that such prior art is widely known or forms part of common general knowledge in the field.

A blockchain is a decentralized, distributed, public ledger of transactional data. Often the data is additionally secured by cryptography. Transactions are grouped in blocks and linked in a chain to create a ledger that is secure against unauthorized tampering.

Blockchain technology became a popular technology in connection with Bitcoin, which is a digital currency. Bitcoin serves as an intermediary to allow financial transactions without a bank. However, blockchain can be used for any type of information. The concept behind this technology is a decentralized database, which is stored on a number of computers which records transactions between various parties. The transactions are processed peer-to-peer, in other words, directly between the parties, and are confirmed by all connected computers, also called nodes.

These nodes add credibility to the transaction. A central record instance is not necessary with this technology. Since there is no central database, i.e. not a single computer which can be manipulated by hackers, this technology is considered to be very secure. With the distributed database, any possibly unauthorized tampering with the data of an individual node is immediately obvious. The totality of all nodes that are working together is sometimes called a ledger.

In addition to the decentralization, the concept of a distributed ledger is crucial. A distributed ledger is a consensus of replicated, shared, and synchronized digital data which resides on multiple nodes, i.e. computers, which might be very distant from each other. There is no central administrator or centralized data storage. A peer-to-peer network is required, and a distributed ledger has consensus algorithms, which ensures replication across the nodes.

A blockchain is a specific implementation of a distributed ledger. A blockchain could be public or private, depending on the usage it is designed for. The difference between public and private systems is defined by access rights to the data. A public blockchain network is open and anyone can use the network. A drawback of a public blockchain is the necessity of increased computational power which is used for maintaining the distributed ledger. In particular, the consensus algorithms need to be executed on every node of the network, which must solve a complex cryptographic problem called a proof of work to make sure that all nodes have the same data. This cryptographic problem is usually using a lot of resource in the node's computer.

In a private blockchain system, only certain predefined users have permission to write, and thus can create new transactions on the blockchain. A private blockchain is thus a closed network that offers some of the benefits of the technology to a pre-defined group. A private blockchain is not necessarily decentralized or distributed. Other permissions, e.g. read permissions, can be defined individually as well.

In the peer-to-peer (P2P) network, the ledger data is replicated and saved as identical copies and updated independently on all participating nodes. The nodes in the network agree by consensus to any updates in the records (or transactions) in the ledger. This consensus makes the records reliable. These records are also immutable, meaning they can never be erased.

The information in a blockchain is bundled together in blocks that are linked together. An individual block contains the checksum for the previous block and also the checksum for the entire chain. All previous transactions are therefore documented in the blockchain. Individual items cannot be changed later. The decentralized system and the permanently available transaction history provide a high level of security.

Transactional security is very important for financial service providers. Financial systems that are commonly in use today are centralized systems, under the control of banks, credit card companies, and payment processors. These systems function as third-party intermediaries to help facilitate transactions between parties.

Although a centralized system like these might have benefits, the intermediary usually takes a fee for the transaction. Furthermore, the process via intermediaries also takes time, whereby the transactions take considerably longer.

Blockchain technology can remove the need for intermediaries. Blockchain creates digitally signed, secure, and tamper-proof ledgers. With this technology the way transactions between multiple parties operate is fundamentally changed.

Existing Blockchain systems work on the concept of tokens or coins, such as Bitcoin and Bitcoin Cash, which are implementations of Blockchain token ledgers. Each token is exchanged by signing it to another user, thereby transferring ownership of the token. Tokens are arranged into blocks. However, this block-wise arrangement also has drawbacks, for example the transaction processing is slowed because all transactions must wait for a block to be completed before committing. This process can take minutes and prevents 'instantaneous' settlement.

The mining process is also of relevance to the technology, since it is the process of discovering tokens by uncovering the data and the cryptographic hash code required for currently undiscovered tokens to be assigned to a user. In other words, mining is a term used for the process of assembling new blocks and rewarding the computers that performed this assembling the quickest, e.g. with a new Bitcoin. A node that mines is assembling the recent transactions into a correctly formatted file. Every node performs this task, and the first one reporting back the correct result and adding the new block to the end of the Blockchain, is rewarded with new Bitcoins.

With the currently known system, every transaction involves the exchange or swap of assets or monies. This process is also called clearing. For a purchase, the exchange of the good or service from a first party, e.g. a seller, to a second party, e.g. a buyer, and the exchange of an equivalent in value, for example a currency or a good or service of the same value from the second party to the first party, are conducted. Depending on the agreement between the parties, the value of the subject handed over by the purchase and the value of the subject handed over in return can deviate.

When the traded goods and services involve digital assets, a first exchange referring to the traded subject, i.e. the digital assets, is performed and a separate exchange is performed for the so-called payment. In order to increase readability, the two elements of trade are called goods and payment in the following, although it is clear that also services can be traded, and that payment may be another good or service as well. Also, for facilitation, the parties are referred to as seller or party A and buyer or party B in the following.

Even with blockchain technology, current technology commonly facilitates this via third party escrow or technically costly and inferior smart contracts between separate tokens. Multi-party solutions exist which are like cheque-signing, where multiple parties must sign the transaction, or smart contracts, where a script is run on the token.

In using third party escrow as shown in FIG. 1 both parties transfer their assets to a trusted third party whom then performs the exchange of the assets between the parties. A drawback with this mechanism is that many transfers are required. The following transfers are necessary for completion: Transfer the goods from seller to escrow, transfer payment from buyer to escrow, transfer goods from escrow to buyer, and transfer payment from escrow to seller.

Since every transaction takes time, incurs costs and is prone to technical problems like transmission errors, this solution is not optimal.

In using smart contracts as shown in FIG. 2, two transfers are performed. Each transfer hands over a token with a smart contract attached. Smart contracts eliminate the necessity to have an intermediary like a third-party escrow. Smart contracts can define rules of an agreement, similar to a common contract. Furthermore, a smart contract also enforces the party obligations arising from the smart contract. Such enforcement may include a time limit. The payment is transferred to the seller, but if the goods are not transferred in the agreed time, the payment is refunded. If the goods are transmitted within agreed parameters, the goods are released to the buyer and the payment is released to the seller.

The tokens are exchanged and comprise scripts which link the two tokens together. However, this mechanism lacks security, as the scripts may have vulnerabilities both in their code and within the virtual machine environments upon which they execute. One solution to this is using a third party to audit and verify each smart contract, however this introduces a further external process.

The object of the present invention is thus to overcome the above detailed problems of the prior art, or at least to provide a useful alternative.

SUMMARY OF THE INVENTION

Accordingly, the invention provides a computer-implemented method and system for digitally signing transactions, as defined in the independent claims.

The solution of the present invention allows multiple counterparties, i.e. buyer and seller, to come to an agreement, provide the respective digital asset sources, i.e. goods and payment, and digitally sign the transaction in advance of being booked to a ledger that executes the trade, i.e. the asset exchange. In the presented solution, the digital asset sources are directly transmitted and compared to tokens representing individual assets which are then merely reassigned.

Unless the context clearly requires otherwise, throughout the description and the claims, the words "comprise", "comprising", and the like are intended to be construed in an inclusive sense as opposed to an exclusive or exhaustive sense, i.e. "including, but not limited to".

BRIEF DESCRIPTION OF THE DRAWINGS

Preferred embodiments of the invention will now be described, by way of example only, with reference to the accompanying drawings in which.

DETAILED DESCRIPTION

In the present invention, a transaction is pre-prepared securely and only takes effect when written to the ledger by either party. That way, only one single transmission is performed to the ledger, after an exchange between two counterparties occurred.

When used with tamper-proof blockchain technology, the method of the present invention combined with ledgering of transactions rather than tokens increases the security of transaction processing, also less time and processing power is used.

For signing the transaction by the parties, cryptographic keys can be used. Different alternatives can be used, for example, Elliptical Curve Cryptography, which is known e.g. from Bitcoin, RSA cryptography, DSA cryptography, password-authenticated key agreement techniques, or any other known technique using public-private key pairs.

The hash of the public keys are the addresses of the counterparties which are contained within the transaction block. The counterparties' private keys are only used to sign the blocks and are never transmitted through the system or accessed remotely.

Figure 1:
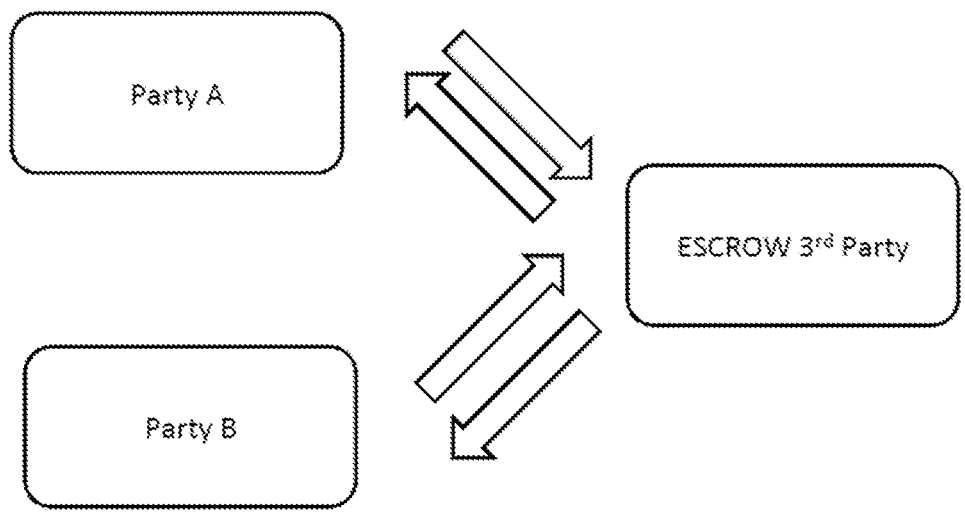
FIG. 1 shows a schematic diagram of the prior art using third-party escrow to conduct a trade.
Figure 2:
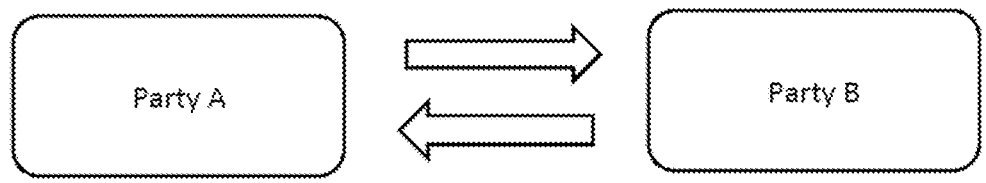
FIG. 2 shows a schematic diagram of the prior art using smart contacts to conduct a trade.
Figure 3:
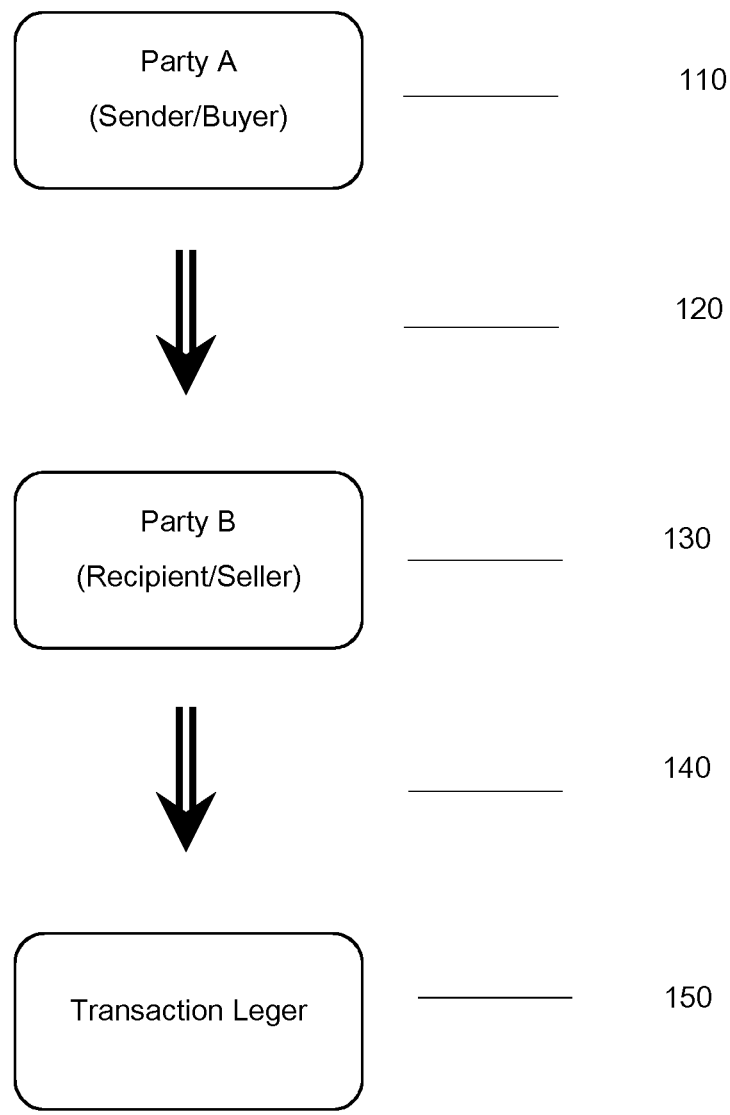
FIG. 3 shows a schematic diagram of a transaction flow according to an embodiment of the present invention.
Figure 4:
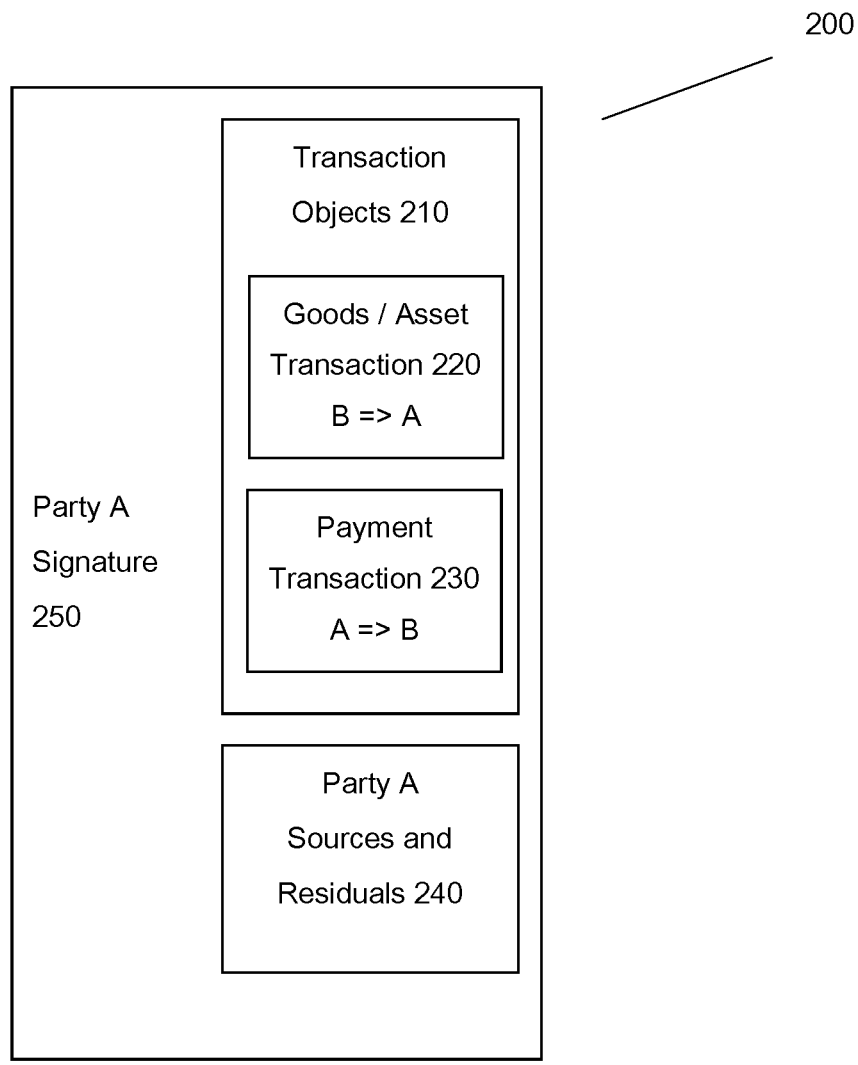
FIG. 4 shows a diagram of the structure of a multi-party transaction block.
Figure 5:
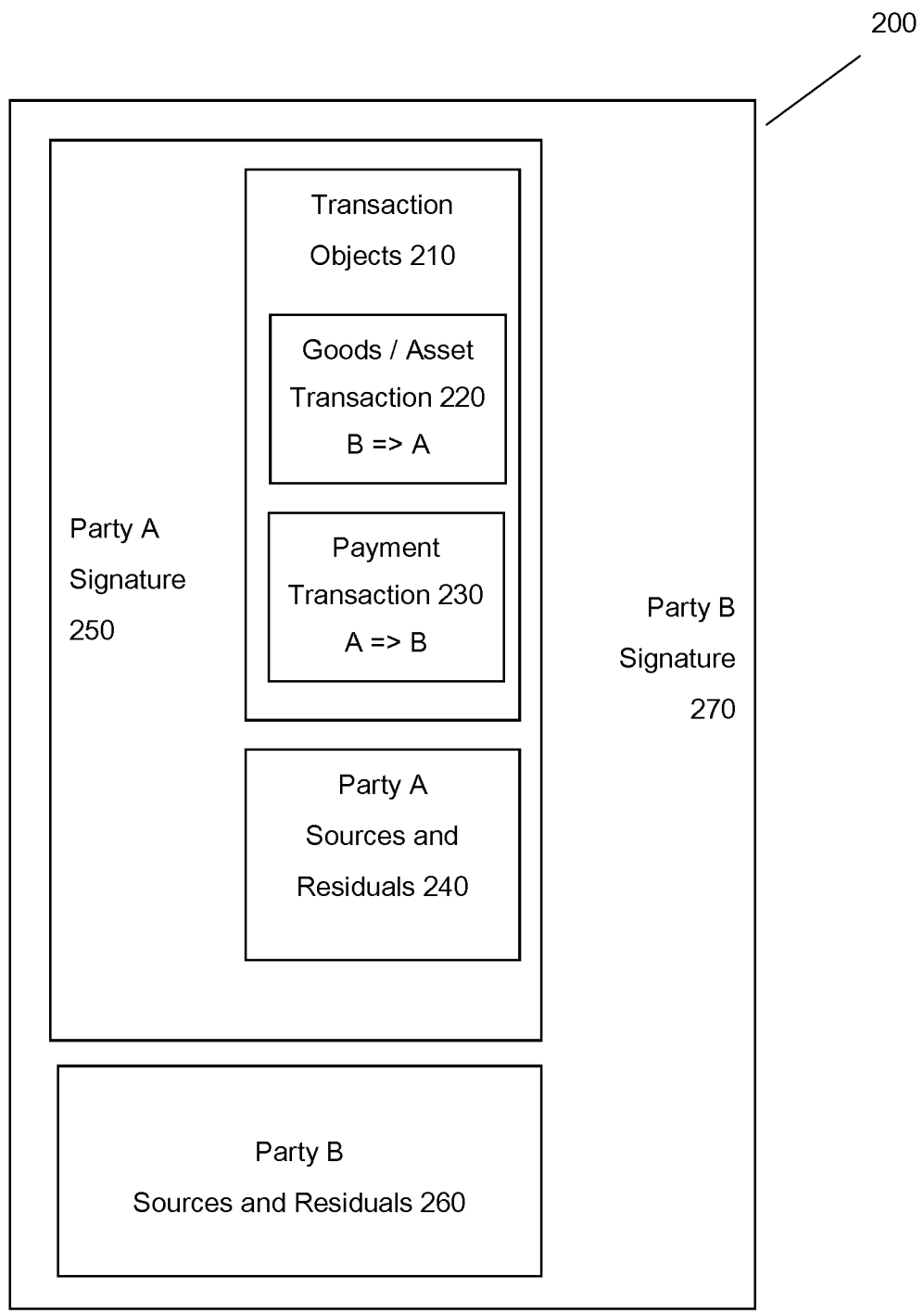
FIG. 5 shows a further diagram of the structure of a multi-party transaction block.

Referring to FIG. 3, party A 110 sends a multi-party transaction block, as can be seen in FIG. 4, to party B 130. The multi-party transaction block 200 consists of a set of transaction objects containing the transactions being proposed by party A including the addresses being used. In this regard, party A defines the parameters of the transaction, i.e. the goods and the payment. One multi-party transaction block 200 can comprise more than one transaction between party A and party B.

The multi-party transaction block 200 originally, after party A created it and for sending it to party B consists of a group of transaction objects 210, comprising two transactions for each trade. Good transaction 220, which defines which good or asset is to be transferred from party B to party A, and payment transaction 230, which defines what payment is to be transferred from party A to party B. Both only will be coming into effect after fulfilling all requirements and after being written to the ledger. Party A defines the transaction objects 210 and adds the sources 240 for the payment transaction 230 to the multi-party transaction block 200. A source is digitally representing the assets and is for example implemented by the hash codes of unspent assets within the ledger.

Finally, party A uses its key to digitally sign the multi-party transaction block 200, thereby creating an envelope of the contents and attaching the signature 250 to the multi-party transaction block 200.

Party A 110 then sends the multi-party transaction block 200 to party B 130 in step 120.

If party B 130 wants to conduct the trade as suggested by party A in the transaction objects 210, it adds its own sources and residuals 260 and attaches its signature 270 to the multi-party transaction block 200.

If party B does not want to conduct the trade, because for example it does no longer possess the requested goods as defined in goods transaction 220, the multi-party transaction block 200 can simply be discarded. Since the ledger is not informed about the sources 240 included in the transaction block, the payment is not transferred or otherwise bound.

After confirming the trade and adding its signature 270 to the transaction block 200, party B send 140 the block 200 to the ledger 150. This creates an immutable record of the transaction upon the ledger, effectively swapping the represented digital assets by agreement in an atomic, immutable way.

The assets are initially represented on the ledger. The ledger is maintained by custodians, which could—in addition to the presented method—also register transactions for assets which are not initially represented on the ledger.

Since the assets for the trade, i.e. goods 260 and payment 240, are on the ledger already, the transaction is executed instantly, wherein general security measures can be applied, i.e. the presence and integrity of the signatures is checked, the availability of the assets 240 and 260 is verified, and so on. In other words, the ledger 150 checks the authenticity of digital signatures 250 and 270 and the validity of the transaction object 210 and the asset sources 240 and 260. Only if all security parameters are fulfilled, the ledger executes the transaction. This refers to correct signatures, sufficiency of funds, presence of goods, correctness of the transactions, and so on. If all checks return positive results, i.e. indicating that the transaction can and should be executed, the ledger executes the transaction.

The multi-party transaction block 200 might comprise a deadline, until a time when party A wants the transaction offer to lapse. If party B transmits the fully signed block 200 to the ledger 150 after that time, the transaction is not executed.

If the ledger is based on blockchain technology, its immutability is an additional benefit. However, in order to store assets and execute the transactions, the present invention could also be implemented in traditional databases where security to access the database and write into the database can be assured.

With a blockchain-type ledger, the benefits of this technology can add the additional security of goods and payment resources—which would be stored in the blockchain ledger with the above discussed benefits—to the execution speed and resource benefits of the present invention. Thereby parties A and B at no point hold their digital assets directly, which would make them prone to tampering or loss, but they are securely stored on the blockchain ledger.

One implementation is in securing digital identity, counterparties can use this mechanism to securely identify each other, by each signing a transaction containing identity content pre-agreed.

In another implementation, the parties access their portfolio or wallet via a secure web-based front end and configure the transaction blocks 200 there. Alternatively, this could also be performed from within a computer program, i.e. application. The web-based front end of the application serves for exchanging goods and payment and is thus called exchange.

The exchange can issue instructions, for example utilising FIX, a financial messaging protocol defining trading messages, to the node hosting the ledger, i.e. the custodian, the ledger in this case being a FIX Blockchain, and the integration to the marketplace APIs, the APIs typically being web services.

Another application is for example a settlement ledger, a back office and a client portal for prime brokers. Prime brokers provide a mechanism for smaller brokers to access larger liquidity providers, such as banks, partly by acting as a credit guarantor. This technology is therefore also applicable to assets other than crypto-currencies including the largest trading market in the world—foreign exchange—where brokers, prime brokers and liquidity providers can feel secure that the provisions of the Transactional Blockchain with FIX platform ensure instant settlement with no credit requirements.

Another application is for example a price feed source. Currently, market data, including time and sales is provided by exchanges where brokers have an obligation to print their trades for transparency. The exchanges then sell this market data to vendors, who sell it on. Both market data vendors and exchanges charge exorbitant licence fees for access to this market data. With instant settlement, as provided by the present invention, the FIX transaction solution becomes a valuable source of accurate real-time market data for time and sales.

Another application is for example a regulatory reporting. With increased regulatory requirements affecting all areas of the financial trading community, the transparency and instant settlement available via the FIX blockchain transaction ledger means that the regulatory reporting can all be provided from the ledger itself.

Another application is for example a contractual asset swap. The present invention can be applied to a system where contractual assets are exchanged, for example property or property shares. The blockchain transaction ledger with its inherent multi-party security and digital signatures can be extended beyond FIX payloads to exchange other assets including documents securely.

Another application is for example a supply chain management. The present invention can be applied to track and validate the supply chain of various assets prior to contractual exchange.

One example would be as proof of an alleged source which bestows a certification, e.g. ecological quality, or geographical origin, including proof that assets are sourced from non-sanctioned origins for example.

Another application is for example for digital assets, e.g. media. Other assets which can be represented via a combination of DRM (Digital Rights Management) and transaction ledgering include digital assets including media, such as digital representations of music, books and video. Current solutions do not allow for re-assignment of the assets; using the blockchain transaction ledger would provide a mechanism for secure and singular assignment to another party, much as the physical asset, such as a CD, DVD or book can be transferred to another party, but not copied.

Another application is for example a securitised asset exchange. A secondary market can be created by securitising assets for exchange, this technology can provide secure and robust clearing services which do not currently exist.

Another application is for example an entertainment exchange. The present invention can be applied to create value and securely exchange rewards earned within computer and mobile game platforms, due to the speed, ease and security with which transactions can occur.

In the following, more implementation details are given by way of example only. It is clear to a person skilled in the art that other implementations of the present invention are at least equivalent and embody the invention.

A transaction could be conducted between two parties using the FIX protocol as follows:

A local node displays a webpage showing a screen to the user where he logs in securely to the local node using user details like username and password. This will retrieve the user's wallet details from the database. The private key is not stored on the database and thus not retrieved.

The screen displays different elements to the user which can comprise: A client blockchain address used by this user for transactions, an entry form of a FIX execution report to create a transaction, a list of all recent transactions and transactions in progress, a FIX message contents showing for example execution report or trade capture information, settlement instruction details including any asset swaps.

A transaction could have one of following states: Pending, initiated, received, completed, error, or rejected. Other states are possible, too. Pending is a received FIX transaction which the user received but has not acted on it yet and it has not been processed by an automated matching process either. Initiated is a received FIX transaction which the user has acted on and is awaiting processing by the counterparty. Received indicates that a blockchain settlement instruction has been received from a counterparty. The user can act on it. Completed indicates that a transaction has been accepted by both parties and is committed to the ledger. Upon submission of the transaction block to the ledger, all parties involved in the transaction will receive notification that the transaction is completed, and their wallets are updated accordingly. Error indicates that a transaction has been either rejected or withdrawn by either of the involved parties or that the transaction has been refused by the ledger due to insufficient assets held. In this case all parties involved in the transaction will receive a corresponding notification.

The error status can be represented by a plurality of states, though, if more information is desired. For example: rejected by party A or party B, indicating the rejecting party by their username, blockchain address or other means of identification, refused indicating that the ledger refused to execute the transaction, transmission error if the received transmission fails a checksum test, withdrawn if the issuing party withdrew the transaction, expired if a user set or system set time was exceeded to complete and submit the transaction. An expiration date can, of course, be indicated not only in full days, but could be set in any combination of years, months, weeks, days, hours, minutes, seconds, milliseconds, or other entities referring to time. More information referring to the concrete reason could be included as well.

If one of the presented information relating to a transaction is selected, additional information and details can be displayed to the user. For example, an incoming transaction can be viewed by selecting it from the list and its FIX and settlement contents are then displayed.

After a transaction is sent, and before a response has been received, i.e. accepted, error, refused, etc, the local node can mark the resources of this transaction as in use in order to avoid a second allocation of the same source. This is locally only and for the information of the user, since it does not affect the ledger before the transaction is submitted to the ledger.

Upon any rejection, error or timeout the sources marked in that manner are released again and are freed for reuse. Thereby rejections are reduced by preventing multiple simultaneous transactions attempting to use the same sources, which would ultimately fail at the ledger booking.

Automated matching matches trades by transaction code along with the asset traded, quantity and price as well as the correct counterparty. A tolerance is usually accepted for rounding errors and foreign exchange conversion. As an example, such transaction codes are known as execid in FIX.

As well as the automated matching process for drop copy FIX transactions, these incoming transactions may be accepted or rejected manually through this screen by using buttons, keyboard shortcuts, or even verbal or gesture control. The buttons may be colour coded, i.e. the accept button green and the reject button red. The buttons may also have text near or on them if monochrome display is preferred or required.

If an incoming transaction is accepted, i.e. the user is party B, the transaction will be processed as detailed above and submitted to the ledger. Rejecting the transaction will notify the initiator, i.e. party A, that the transaction was rejected. The ledger is not encumbered by any processing in this case.

If the transaction is submitted to the ledger, only then the ledger initiates the atomic swap of assets.

The user's wallet screen can furthermore provide a hierarchical view of unspent blockchain assets held by the addresses associated with this user. Each asset is summarised and can be further expanded to detail the blockchain sources used in any transactions. The local blockchain node computes which sources to apply to any transaction, along with any unspent change and securely adds this to the transaction when initiated or accepted.

The present invention may be further understood with reference to the following wherein an example will be described based off of the following definitions:

Let $\Phi(\ )$ represent the results of an operation on sets of parameters enclosed within the brackets.

The invention requires a network (settlement network) of counterparties collected into nodes (such that more than one counterparty will belong to a node and the network is comprised of more than one node). This settlement network is separate and distinct to the network of ledger nodes and is where counterparties co-operate on agreeing and signing transactions prior to their being committed to the ledger instances.

Thus, Let N be the set of nodes n on a settlement network where transactions t are conducted between counterparties c on the set of nodes N where each node n shares a common implementation of the system.

$$N = \{n_1, n_2, n_3, \ldots\}$$

Let $C_n$ be the set of counterparties c belonging to each node n:

$$C_n = \{c_1, c_2, c_3, \ldots\}$$

where each set of counterparties C belongs to an element of a node n:

$$n_i \ni C_n$$

Now, let UC be the superset of all counterparties c belonging to the set of nodes N (the total set of counterparties C on the settlement network)

$$UC = \bigcup_{n=1}^{n} Cn$$

Now, let A be the set of assets a:

$A=\{a_1,a_2,a_3,\ldots\}$

Let T be a set of transactions t. The transaction t refers to a transfer of an asset a from a sender counterparty s to a recipient counterparty r. The sender counterparty s could be a buyer and the recipient counterparty r could be a seller.

$s \in UC, r \in UC$ $T=\{t_1,t_2,t_3,\ldots | t_i \in \Phi(a,s,r)\}$

Let D be a set of digital signatures d of the transaction set T for each counterparty c (can be sender counterparty s or recipient counterparty r)—each sender counterparty s and recipient counterparty r element of each transaction t within the transaction set T:

$D=\{d1,d2,d3,\ldots | d_n \in \Phi(T,H)\}$

The digital signature set D is initially empty but is passed from node to node, where if a counterparty c is local (i.e. the private key is present) a digital signature d can be added to the digital signature set D for the transaction set T and also existing signatures, i.e. {T, D}:

Let D=∅ Let B represent the set of custodians b, identified by address (hashed public key):

$B=\{b_1,b_2,b_3,\ldots\}$

Let W be the wallet for the sender counterparty s, a subset of an unspent cache U (the unspent cache U being a store of source hashes h):

$W=\{w|w \in U \cap s\}$

Let H be a set of source hashes h (the available resources for the sender counterparty s to spend) to use for an element of the transaction set T for the asset a:

$H=\{h_1,h_2,h_3,\ldots | h_i \in W \cap a_i\}$ where $a_i \in t_i$

Such that each element of the transaction set T (each transaction t) contains a set of source hashes H:

$t_i \ni H$

Let O represent the ledger of all transactions, where a ledger entry is an operation on the transaction set T, each containing with it a set of source hashes H to spend and digital signature set D that make up a ledger entry:

$O=\{o_1,o_2,o_3,\ldots | o_i \in \Phi(T,D)\}$

Let X be a set of resulting hashes x from committing the transactions t to the ledger O:

$X=\{x_1,x_2,x_3,\ldots | x_i \in \Phi(T,D)\}$

The ledger holds a record of all assets a as hashes; spent hashes as source hashes h and resulting hashes as resulting hashes x when the ledger entry is created (either from spending other hashes or from a custodian b).

The assets a which are tradable on the ledger O are referred to as the 'unspent'; these are the resulting hashes x which haven't yet been used as source hashes h in other transactions t.

Let U represent the 'unspent' cache (unspent hashes h) i.e. such that:

$U_h=\{h|h \in U_{n=1}^{n} H_n\}$ (where $H_n$ is all sender source hashes $h$ in all transactions in the ledger $O$–the spent hashes)

$U_x=\{x|x \in U_{n=1}^{n} X_n\}$ (where $X_n$ is all resulting hashes $x$ in writing all transactions $t$ in ledger $O$–the new/replacement hashes)

Thus:

$U=U_x \backslash U_h$

Such that U is the set of all hashes of entries in the ledger excluding the set of all source hashes h which have been used as sources in transactions, i.e. already spent.

The example will be based on the following method:

Apply the following settlement appliance logic:

Initially, send a set containing transaction set T and digital signature set D {T, D=∅} to a node n identified as belonging to a counterparty c in transaction set T, then apply the following appliance logic and repeat for each node n to which the superset of signed, sourced transactions {T, D} is sent.

Let L be the set of local (to the node n) counterparties c as identified in sender counter party s and recipient counterparty r in each transaction t in transaction set T.

Let Z be the set of checks (criteria for settlement) for the transaction t to include (but not limited to): agreed quantities of asset swaps, tolerance for rounding to the nearest multiple or unit, tolerance for Forex transactions, agreed commission payments and agreed transaction charges.

Now shown using pseudocode:

For each transaction t in the transaction set T:

Let s be the sender counterparty and r be the recipient counterparty belonging to transaction t.

If a source check sc is valid, i.e. if the sender counterparty s is local to the node $n_l$ and transaction t hasn't been processed (no set of source hashes H within transaction t):

```
If s ∈ C_n and H ∉ t then
  If transaction t matches the criteria for settlement Z:
  If Φ(t, Z) then
    Using the wallet W for sender counterparty s, create a subset of
    sender source hashes H_s for transaction t for asset a:
    H_s = {h_1, h_2, h_3, ... | h_n = Φ(s, t, W ∩ a)}
    Qualify transaction t by adding the source hashes set H_s to it:
    Let t = t ∪ H_s
    Keep a set of processed local sender counterparties L. The local
    sender counterparties are sender counterparties s in transaction t and
    in the counterparty set C_n belonging to the local node n_l:
    Let L = {L ∪ s |s ∈ ( t∩C_n)}
  End If
End If
```

Keep a set of local recipient counterparties P where the recipient counterparty r is in the counterparty set $C_n$ belonging to the local node $n_l$:

Let $P=\{r|r \in P \cup (t \cup C_n)\}$

Keep a set of unsigned remote (not belonging to the local node $n_l$) counterparties M for sender counterparties s and recipient counterparties r, both of which being in transaction t but are not belonging to the local node $n_l$ and are not in the signature set D:

Let $M_s=\{s|s \in M_s \cup t / \backslash s \notin C_n / \backslash s \notin D)\}$ Let $M_r=\{r|r \in M_r \cup t / \backslash r \notin C_n / \backslash r \notin D)\}$ Let $M=\{m|m \in M_r \cup M_s\}$ Keep a set of already signed remote counterparties Q for all sender counterparties s and recipient counterparties r both of which being in transaction t and are in the signature set D but are not belonging to the local node $n_j$:

Let $Q_s=\{s|s\in Q_s\cup t\cap D/\backslash s\notin C_n\}$

Let $Q_r=\{r|r\in Q_r\cup t\cap D/\backslash r\notin C_n\}$

Let $Q=\{q|q\in Q_r\cup Q_s\}$

End Loop

If there are any local sender counterparties s or local recipient counterparties r:

---

If L ∪ P ≠ Ø then
   Digitally sign the transaction set T and any existing signatures d already in the
   signature set D and then add the resulting signature to signature set D, signature set
   D becoming a new signature set D:
   Let D = {$d_1$, $d_2$, $d_3$, ... | $d_n$ ∈ D ∪ Φ(T, D)}
End If

---

If the transaction set T is all signed such that the number of signatures d matches the number of local sender counterparties s, local recipient counterparties r and signed remote senders and recipients, it is ready for the ledger O:

---

If M = Ø and |D| = |L∪P∪Q|
   Send the superset of signed, sourced transactions {T, D} to a ledger node (ledger
   entry o) and perform the ledger node logic detailed below.
Otherwise, if we have an as-yet unsigned, remote counterparty (sender counterparty s or
recipient counterparty r) in the transaction set T:
Else If M ≠ Ø
   Send {T, D} to the first element of M and repeat the settlement appliance logic for
   node M.
Else
   Report an unfulfilled transaction error.
End If

---

Let Y represent a set of checked transactions t and source hashes h, initially empty:

$$Y=\emptyset$$

Let K represent a set of all source hashes h, initially empty:

$$K=\emptyset$$

Upon receipt of the superset representing the signed, sourced transactions {T, D}:
   For each transaction t in the transaction set T:
      If the signature d in the signature set D is valid for sender counterparty s and recipient counterparty r where:

--- s ∈ t ∧ r ∈ t
   For each source hash h in the set of source hashes H:
      If the source hash h is unspent (in U) or sender counterparty s
      is a custodian b:
         If (h ∈ U and h ∉ Y) or s ∈ B then:
            Add to the set of checked transactions and source
            hashes Y:
            Let Y = {y | y ∈ Y ∪ h}
         End If
   End loop
   Keep a list of all source hashes h by adding all of the set of source
   hashes H to the set of all source hashes K:
   Let K = {k | k ∈ K ∪ H}
   End If
End loop

---

If |Y|=|K| then
   Write the superset of signed, sourced transactions {T, D}
   to the ledger O as source hash set H with resulting hash
   set X.
   To update the unspent cache U:
   First remove the spent source hashes h represented by the
      set of checked transactions and source hashes Y from
      unspent cache U (i.e. remove any source hashes h in
      unspent cache U referring to any element of the set of
      checked transactions and source hashes Y), then add
      the set of resulting hashes X to the unspent cache U (i.e.
      the new resulting hashes are unspent and collectively
      form a replacement unspent cache U).
   Let U={u|u∈(U/Y)∪X}
End If

---

The following is an example application of the above method:

Let there be 4 counterparties c such that:

$$UC=\{c_1,c_2,c_3,c_4\}.$$

Let two nodes $n_1$ and $n_2$ exist representing counterparties $c_1$, $c_3$ and $c_2$, $c_4$ respectively.

$$N=\{n_1,n_2\}, \text{ where } C_1=\{c_1,c_3\}\in n_1 \text{ and } C_2=\{c_2,c_4\}\in n_2$$

Let counterparty $c_1$ (could be a recipient counterparty s) have 1 unit of asset $a_1$ represented by source hash $h_1$ and 1 unit of asset $a_3$ represented by source hash $h_3$.

Let counterparty $c_2$ (could be a sender counterparty r) have 1 unit of asset $a_2$ represented by source hash $h_2$ and 1 unit of asset $a_4$ represented by source hash ha.

Thus, the unspent cache U:

$$U=\{\Phi(c_1,a_1,h_1),\Phi(c_1,a_3,h_3),\Phi(c_2,a_2,h_2)\Phi(c_2,a_4,h_4)\}$$

Now, let a transaction t be agreed where counterparty $c_1$ transfers a unit of asset $a_1$ to counterparty $c_2$ in exchange for a unit of asset $a_2$ being transferred from counterparty $c_2$ back to counterparty $c_1$. Also, let counterparty $c_1$ transfer a unit of asset $a_3$ to counterparty $c_3$ to represent a commission charge and counterparty $c_2$ transfer a unit of asset $a_4$ to counterparty $c_4$ to represent a trade fee.

Thus the transaction set T:

$$T=\{\Phi(a_1,c_1,c_2),\Phi(a_3,c_1,c_3),\Phi(a_2,c_2,c_1),\Phi(a_4,c_2,c_4)\}$$

For each transaction t in the transaction set T:
Starting with transaction $t_1 = \Phi(a_1, c_1, c_2)$:
For the purpose of the example, let us suggest it matches the settlement check Z.

Again, for the purposes of this example, let us state that both the signature check dc and source check sc are valid; counterparty $c_1$ is local to node $n_1$ and transaction $t_1$ hasn't been processed.

Using the wallet W for counterparty $c_1$ from unspent cache U: counterparty $c_1$ has source hash $h_1$ for asset $a_1$; add this to the set of source hashes H.

$H = \{h_1\}$

Add the set of source hashes H to the transaction set T: Thus transaction set T:

$T = \{\{\Phi(a_1,c_1,c_2),h_1\},\Phi(a_3,c_1,c_3),\Phi(a_2,c_2,c_1),\Phi(a_4,c_2,c_4)\}$

Add counterparty $c_1$ to the set of processed local sender counterparties L:

$L = \{c_1\}$

Add counterparty $c_2$ to the set of remote unsigned counterparties M:

$M = \{c_2\}$

Loop to next transaction $t_2 = \Phi(a_3, c_1, c_3)$:
It matches the settlement check Z.
Signature check dc and source check sc are valid; counterparty $c_1$ is local to node $n_1$ and transaction $t_2$ hasn't been processed.
Use the wallet W for counterparty $c_1$ from unspent cache U: counterparty $c_1$ has source hash $h_3$ for asset $a_1$; add source hash $h_3$ to the set of source hashes H:

$H = \{h_3\}$

Add the set of source hashes H to the transaction set T:

$T = \{\{\Phi(a_1,c_1,c_2),h_1\},\{\Phi(a_3,c_1,c_3),h_3\},\Phi(a_2,c_2,c_1),\Phi(a_4,c_2,c_4)\}$

Counterparty $c_1$ is already an element of the set of processed local sender counterparties L.
Counterparty $c_3$ is a local recipient counterparty, add to the set of local recipient counterparties P:

$P = \{c3\}$

Next iteration of transition $t_3$: $\Phi(a_2, c_2, c_1)$
Counterparty $c_2$ is not a local sender counterparty. Signature check dc is invalid.
Counterparty $c_1$ is a local recipient counterparty.
Add counterparty $c_1$ to the set of local recipient counterparties P:

$P = \{c_3, c_1\}$

Counterparty $c_2$ is already in the set of remote unsigned counterparties M:

$M = \{c_2\}$

Next iteration of transition $t_4$: $\Phi(a_4, c_2, c_4)$
Counterparty $c_2$ is not a local sender counterparty. Signature check dc is invalid.
Counterparty $c_4$ is not a local recipient counterparty.
Counterparty $c_2$ is already an element of the set of remote unsigned counterparties M.
Add Counterparty $c_4$ to the set of remote unsigned counterparties M:

$M = \{c_2, c_4\}$

Now apply digital signatures d:
Counterparties c that are an element of the set of processed local sender counterparties L or the set of local recipient counterparties P:

$L \cup P = \{c_1, c_3\}$

Add digital signatures d for counterparty $c_1$ and counterparty $c_3$:

$D = \{\Phi(T,H,c_1), \Phi(T,H,c_3)\}$

Now send superset representing the signed, sourced transactions $\{T, D\}$ to the owner of the first element of the set of remote unsigned counterparties M:
The first element is counterparty $c_2$ so the owner is node $n_2$:
Node $n_2$ receives the superset representing the signed, sourced transactions $\{T, D\}$.
For each transaction t in transaction superset T:
Starting with transaction $t_1 = \Phi(a_1, c_1, c_2)$:
Counterparty $c_1$ is a non-local (remote) signed sender counterparty, so add to the set of already signed remote counterparties Q:

$Q = \{c_1\}$

Counterparty $c_2$ is a local recipient counterparty so add to the set of local recipient counterparties P:

$P = \{c_2\}$

Loop to next transaction $t_2$: $\Phi(a_3, c_1, c_3)$:
Counterparty $c_1$ is a remote signed sender counterparty and is already in the set of already signed remote counterparties Q.
Counterparty $c_3$ is a remote signed recipient counterparty so add to the set of already signed remote counterparties Q:

$Q = \{c_1, c_3\}$

Loop to next transaction $t_3$: $\Phi(a_2, c_2, c_1)$:
Signature check dc and source check sc is valid; counterparty $c_2$ is local to node $n_2$ and transaction $t_3$ hasn't been processed.
Use the wallet W for counterparty $c_2$ from the unspent cache U. Counterparty $c_1$ has source hash $h_2$ for asset $a_2$; add this to the set of source hashes H:

$H = \{h_2\}$

Add the set of source hashes H to the transaction set T. Thus:

$T = \{\{\Phi(a_1,c_1,c_2),h_1\},\{\Phi(a_3,c_1,c_3),h_3\},\{\Phi(a_2,c_2,h_2),\Phi(a_4,c_2,c_4)\}$

Add counterparty $c_2$ to the set of processed local sender counterparties L:

$L = \{c_2\}$

Counterparty $c_1$ is already an element of the set of already signed remote counterparties Q.
Loop to next transaction $t_4$: $\Phi(a_4, c_2, c_4)$:
Signature check dc and source check sc is valid; counterparty $c_2$ is local to node $n_2$ and transaction $t_4$ hasn't been processed.
Use the wallet W for counterparty $c_2$ from unspent cache U. Counterparty $c_2$ has source hash $h_4$ for asset $a_4$; add this to the set of source hashes H:

$H = \{h_4\}$

Add the set of source hashes H to the transaction set T:

$T = \{\{\Phi(a_1,c_1,c_2),h_1\},\{\Phi(a_3,c_1,c_3),h_3\},\{\Phi(a_2,c_2,c_1),h_2\},\{\Phi(a_4,c_2,c_4),h_4\}\}$

Counterparty $c_2$ already in the set of processed local sender counterparties L.

Add counterparty $c_4$ to the set of local recipient counterparties P:

$$P=\{c_4\}$$

Now apply digital signatures d:

Counterparties c that are an element of the set of processed local sender counterparties L or the set of local recipient counterparties P:

$$L \cup P = \{c_2, c_4\}$$

So add digital signatures d for counterparty $c_2$ and counterparty $c_4$. These will encompass the entire transaction set T including any source hashes set H added thus far, and the previously applied signatures d:

$$D=\{\Phi(T,c_1),\Phi(T,c_3),\Phi(T,c_2),\Phi(T,c_4)\}$$

Now the set of remote unsigned counterparties:

$$M=\emptyset$$

And:

$$|D=4|\equiv|L \cup P \cup Q=4|$$

So send the superset representing the signed, sourced transactions $\{T, D\}$ to the ledger node o.

Ledger Node:

Assume the ledger node o has received the superset representing the signed, sourced transactions $\{T, D\}$.

Remember, the transaction set T:

$$T=\{\{\Phi(a_1,c_1,c_2),h_1\},\{\Phi(a_3,c_1,c_3),h_3\},\{\Phi(a_2,c_2,c_1),h_2\},\{(a_4,c_2,c_4),h_4\}\}$$

For each transaction t in the transaction set T:

Iteration for transaction $t_1=\{\Phi(a_1, c_1, c_2), h_1\}$

Check counterparty $c_1$ and counterparty $c_2$ are valid (the public key of each counterparty c is used to verify the signature for each counterparty c in the set of digital signatures D).

Check source hash $h_1$ is in unspent cache U and not already in the set of checked transactions and source hashes Y.

Add source hash $h_1$ to the set of checked transactions and source hashes Y and to the set of all source hashes K:

$$Y=\{h_1\}$$

$$K=\{h_1\}$$

Iteration for transaction $t_2=\{(a_3, c_1, c_3), h_3\}$

Check counterparty $c_1$ and counterparty $c_3$ are valid in the set of digital signatures D.

Check source hash $h_3$ is in unspent cache U and not already in the set of checked transactions and source hashes Y.

Add source hash $h_3$ to the set of checked transactions Y and to the set of all source hashes K:

$$Y=\{h_1,h_3\}$$

$$K=\{h_1,h_3\}$$

Iteration for transaction $t_3=\{\Phi(a_2, c_2, c_1), h_2\}$:

Check counterparty $c_2$ and counterparty $c_1$ are valid in the set of digital signatures D.

Check source hash $h_2$ is in unspent cache U and not already in the set of checked transactions and source hashes Y.

Add source hash $h_2$ to the set of checked transactions Y and to the set of all source hashes K:

$$Y=\{h_1,h_3,h_2\}$$

$$K=\{h_1,h_3,h_2\}$$

Iteration for transaction $t_4=\{\Phi(a_4, c_2, c_4), h_4\}$:

Check counterparty $c_2$ and counterparty $c_4$ are valid in the set of digital signatures D.

Check source hash $h_4$ is in unspent cache U and not already in the set of checked transactions and source hashes Y.

Add source hash $h_4$ to the set of checked transactions Y and to the set of all source hashes K:

$$Y=\{h_1,h_3,h_2,h_4\}$$

$$K=\{h_1,h_3,h_2,h_4\}$$

Now, the number of elements in the set of checked transactions Y is the same as the set of all sources K, so commit the transactions t to O.

Now, to update unspent cache U:

The set of hashes X from committing the set of transactions T to the ledger O:

$$X=\{x_1,x_2,x_3,x_4\}$$

Where source hash $h_1$ becomes resulting hash $x_1$, source hash $h_2$ becomes resulting hash $x_2$ and so on.

Unspent cache U:

$$U=\{\Phi(c_1,a_2,x_2),\Phi(c_2,a_1,x_1),\Phi(c_3,a_3,x_3),\Phi(c_4,a_4,x_4)\}$$

So counterparty $c_1$ now holds asset $a_2$, counterparty $c_2$ now holds asset $a_1$, counterparty $c_3$ now holds asset $a_3$ and counterparty $c_4$ now holds asset $a_4$.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

The invention claimed is:

1. A computer-implemented method for digital signing a transaction between two nodes, comprising:
preparing a multi-party transaction block in a first node of the two nodes, the multi-party transaction block comprising at least one transaction object comprising at least a goods transaction and a payment transaction;

adding first digital asset sources to the multi-party transaction block in the first node;

digital signing the multi-party transaction block with a first digital signature of the first node in the first node;

transmitting the multi-party transaction block to the second node of the two nodes by the first node, wherein the multi-party transaction block transmitted by the first node comprises the goods transaction, the payment transaction, the first digital asset sources, and the first digital signature of the first node;

adding second digital asset sources to the multi-party transaction block, in the second node;

digital signing the multi-party transaction block with a second digital signature of the second node in the second node;

submitting the multi-party transaction block to a transaction ledger by the second node, wherein the multi-party transaction block submitted by the second node comprises the goods transaction, the payment transaction, the first digital asset sources, the second digital asset sources, the first digital signature of the first node, and the second digital signature of the second node;

wherein the first and the second digital asset sources are recorded in the ledger;

wherein the first and second digital signatures are based on public-private key pair technology and at least on one of the following: RSA cryptography, DSA cryptography.

2. The computer-implemented method of claim 1, wherein preparing a multi-party transaction block further comprises adding an expiration date.

3. The computer-implemented method of claim 1, further comprising executing by and in the ledger the goods transaction and the payment transaction for the at least one transaction object.

4. The computer-implemented method of claim 3, further comprising, after submitting multi-party transaction block comprising the goods transaction, the payment transaction, the first digital asset sources, the second digital asset sources, the first digital signature of the first code, and the second digital signature of the second code to the ledger, checking the authenticity of the first and the second signatures and the validity of the transaction objects and the first and the second digital asset sources;

wherein executing the goods transaction and the payment transaction for the at least one transaction object is only performed when checking the authenticity of the first and the second signatures and the validity of the transaction objects and the first and the second digital asset sources returns a positive result.

5. The computer-implemented method of claim 1, wherein the ledger is based on one of the following: blockchain technology, one of the following database-types: operational, distributed, analytical, relational, or hierarchical, or database models.

6. A computer program product including a program for a processing device, comprising software code portions for performing the steps of claim 1 when the program is run on the processing device.

7. The computer program product of claim 6, wherein the computer program product comprises a computer-readable medium on which the software code portions are stored, wherein the program is directly loadable into an internal memory of the processing device.

8. A system for digital signing a transaction between two nodes comprising:

a first node;

a second node; and a transaction ledger;

wherein the first node is configured to:
  prepare a multi-party transaction block comprising at least one transaction object comprising at least a goods transaction and a payment transaction;
  add first digital asset sources to the multi-party transaction block;
  digital sign the multi-party transaction block with a first digital signature of the first node; and
  transmit the multi-party transaction block comprising the goods transaction, the payment transaction, the first digital asset sources, and the first digital signature of the first node to the second node; and wherein the second node is configured to:
  add second digital asset sources to the multi-party transaction block;
  digital sign the multi-party transaction block with a second digital signature of the second node; and
  submit the multi-party transaction block comprising the goods transaction, the payment transaction, the first digital asset sources, the second digital asset sources, the first digital signature of the first code, and the second digital signature of the second code to the transaction ledger;

wherein the first and the second digital asset sources are recorded in the ledger; and wherein the first and the second digital signature are based public-private key pair technology, and at least on one of the following: RSA cryptography, DSA cryptography.

9. The system of claim 8, wherein the first node is further configured to add an expiration date to the multi-party transaction block.

10. The system of claim 8, wherein the ledger is further configured to execute the goods transaction and the payment transaction for the at least one transaction object.

11. The system of claim 10, wherein the ledger is further configured to check the authenticity of the first and the second signatures and the validity of the transaction objects and the first and the second digital asset sources, and wherein the ledger executes the goods transaction and the payment transaction for the at least one transaction object only, in response to a positive response of the check of the authenticity of the first and the second signatures and of the validity of the transaction objects and the first and the second digital asset sources.

12. The system of claim 8, wherein the ledger is based on one of the following: blockchain technology, one of the following database-types: operational, distributed, analytical, relational, or hierarchical, or database models and both text and binary file storage.

* * * * *